(12) United States Patent
Kodama (10) Patent No.: US 11,242,076 B2
(45) Date of Patent: Feb. 8, 2022

(54) PORTABLE STOP DETERMINING DEVICE, STOP DETERMINING SYSTEM, AND STOP DETERMINING METHOD

(71) Applicant: NEC CORPORATION, Tokyo (JP)

(72) Inventor: Rikuki Kodama, Tokyo (JP)

(73) Assignee: NEC CORPORATION, Tokyo (JP)

(*) Notice: Subject to any disclaimer, the term of this patent is extended or adjusted under 35 U.S.C. 154(b) by 153 days.

(21) Appl. No.: 16/484,721

(22) PCT Filed: Feb. 14, 2018

(86) PCT No.: PCT/JP2018/004997
§ 371 (c)(1),
(2) Date: Aug. 8, 2019

(87) PCT Pub. No.: WO2018/151127
PCT Pub. Date: Aug. 23, 2018

(65) Prior Publication Data
US 2020/0039544 A1 Feb. 6, 2020

(30) Foreign Application Priority Data

Feb. 15, 2017 (JP) .............................. JP2017-026021

(51) Int. Cl.
*G08G 1/01* (2006.01)
*B61L 15/00* (2006.01)
(Continued)

(52) U.S. Cl.
CPC ......... *B61L 15/0018* (2013.01); *B61L 25/025* (2013.01); *H04M 11/04* (2013.01); *B61L 2205/04* (2013.01); *H04M 2250/12* (2013.01)

(58) Field of Classification Search
CPC ............... B61L 15/0018; B61L 25/025; B61L 2205/04; H04M 11/04; H04M 2250/12
See application file for complete search history.

(56) References Cited

U.S. PATENT DOCUMENTS 9,730,181 B1 * 8/2017 Matsumoto ....... H04M 1/72463
10,515,548 B2 * 12/2019 Nagao ................. B61L 15/0027
(Continued)

FOREIGN PATENT DOCUMENTS

JP 2005-86718 A 3/2005
JP 2007-120953 A 5/2007
(Continued)

OTHER PUBLICATIONS

Cervantes-Villanueva et al., Vehicle Maneuver Detection with Accelerometer-Based Classification (Year: 2016).*
(Continued)

*Primary Examiner* — Quang Pham
(74) *Attorney, Agent, or Firm* — Sughrue Mion, PLLC (57) ABSTRACT

A portable stop determining device 10 includes an acceleration sensor 115 and a state grasp unit 143 in order to detect that a vehicle such as a train stops, with an adequate degree of accuracy, even when position information of a user and time information are not available. The state grasp unit 143 outputs an alarm signal when detecting deceleration in a direction of travel of the vehicle based on a measured value from the acceleration sensor, and detecting that posture of the portable stop determining device carried by a person riding on the vehicle inclines in the direction of travel and then returns to a basic state.

6 Claims, 7 Drawing Sheets

(51) Int. Cl.
    *B61L 25/02* (2006.01)
    *H04M 11/04* (2006.01)

(56) References Cited

U.S. PATENT DOCUMENTS

| | | | | |
|---|---|---|---|---|
| 2004/0254998 | A1* | 12/2004 | Horvitz | H04L 67/16 709/206 |
| 2006/0010699 | A1* | 1/2006 | Tamura | G01C 22/006 33/355 R |
| 2011/0081634 | A1* | 4/2011 | Kurata | G06N 5/02 434/236 |
| 2011/0111736 | A1* | 5/2011 | Dalton | A61B 5/7465 455/414.1 |
| 2013/0321157 | A1* | 12/2013 | Takamura | H04L 67/22 340/573.1 |
| 2014/0214924 | A1* | 7/2014 | Cha | H04N 21/4333 709/203 |
| 2014/0267799 | A1* | 9/2014 | Sadasivam | H04N 5/23245 348/207.99 |
| 2015/0031400 | A1* | 1/2015 | Tian | H04W 4/023 455/456.3 |
| 2016/0119165 | A1* | 4/2016 | Keronen | H04L 67/2804 370/254 |
| 2017/0185265 | A1* | 6/2017 | Pierce | H04M 1/72454 |
| 2017/0195853 | A1* | 7/2017 | Tanabe | G01C 21/18 |
| 2018/0128641 | A1* | 5/2018 | Kashiwagi | G01P 15/003 |
| 2018/0176363 | A1* | 6/2018 | Kang | H04L 51/043 |

FOREIGN PATENT DOCUMENTS

| | | | |
|---|---|---|---|
| JP | 2007120953 A | * | 5/2007 |
| JP | 2008-131248 A | | 6/2008 |
| JP | 2008131248 A | * | 6/2008 |
| JP | 2012-181163 A | | 9/2012 |
| JP | 2012181163 A | * | 9/2012 |
| JP | 2015-69276 A | | 4/2015 |
| WO | 2006/008790 A1 | | 1/2006 |
| WO | 2016/006634 A1 | | 1/2016 |

OTHER PUBLICATIONS

Li et al., Accurate Fast Fall Detection Using Gyroscopes and Accelerometer-Derived Posture Information (Year: 2009).*
Peng et al., An Investigation of Dynamic Responses and Head Injuries of Standing Subway Passengers during Collisions (Year: 2017).*
Sprager et al., Inertial Sensor-Based Gait Recognition (Year: 2015).*
Zhao et al., Real-Time Vehicle Motion Detection and Motion (Year: 2019).*
Mechanics—Force and Motion—Inertia (Year: 2015).*
Almoosa et al., Wearable Posture Monitoring System with Vibrational Feedback (Year: 2016).*
Lee et al., A new posture monitoring system for preventing physical illness of smartphone users (Year: 2013).*
Ma et al., Posture Detection Based on Smart Cushion for Wheelchair Users (Year: 2017).*
Stockx et al., SubwayPS Towards Enabling Smartphone Positioning in Underground Public Transportation Systems (Year: 2019).*
Written Opinion for PCT/JP2018/004997 dated May 15, 2018 [PCT/ISA/237].
International Search Report for PCT/JP2018/004997 dated May 15, 2018 [PCT/ISA/210].

* cited by examiner

PORTABLE STOP DETERMINING DEVICE, STOP DETERMINING SYSTEM, AND STOP DETERMINING METHOD

CROSS REFERENCE TO RELATED APPLICATIONS

This application is a National Stage of International Application No. PCT/JP2018/004997, filed on Feb. 14, 2018, which claims priority from Japanese Patent Application No. 2017-026021, filed on Feb. 15, 2017, the contents of all of which are incorporated herein by reference in their entirety.

TECHNICAL FIELD

The present invention relates to a technique for detecting a stop of a vehicle such as a train on which a user is riding, for example.

BACKGROUND ART

Services of notifying, based on position information and/or time information, that a vehicle such as a train or a bus arrives at a destination are being provided. For example, in one of such services being provided, a current position of a user is acquired by using a global positioning system (GPS) sensor of a smartphone carried by the user. When the smartphone enters a vicinity of a destination specified by the user, the user is notified that the smartphone is approaching the destination. Herein, the vicinity of the destination refers to an area, for example, within a "radius of 100 meters" from the destination. Further, in another of such services, when a vehicle such as a train or a bus for which a timetable is provided is used, the current time is compared with a scheduled arrival time, and a user is notified, several minutes ahead of the time of arrival, that the vehicle will arrive in several minutes.

PTL 1 discloses a program for preventing a user from missing his/her stop on a train or the like by using position information of the user.

CITATION LIST

Patent Literature

[PTL 1] Japanese Unexamined Patent Application Publication No. 2005-086718

SUMMARY OF INVENTION

Technical Problem

A program and a device that use the technique described above cannot make a notification in a region where position information of a smartphone carried by a user him/herself cannot be acquired. Further, a train, a bus and the like may not be able to arrive at scheduled arrival times on timetables due to an unforeseen accident or trouble, and a program or a device that makes determination based on a timetable provides an alarm with low degree of accuracy.

As described above, a method based on position information of a user and/or time information is not adequate as a method for notifying a user of arrival at a destination.

The present invention has been made in order to solve the problems described above. Specifically, a main object of the present invention is to provide a technique of detecting that a vehicle such as a train stops, with an adequate accuracy, even when position information on a user or time information is not available.

Solution to Problem

A portable stop determining device of an example embodiment includes:
an acceleration sensor; and
a state grasp unit that outputs an alarm signal when detecting deceleration of a vehicle in a direction of travel based on a measured value from the acceleration sensor, and detecting that posture of the portable stop determining device carried by a person riding on the vehicle inclines in the direction of travel from a basic state then returns to the basic state.

A stop determining method of an example embodiment includes:
outputting an alarm signal by a device that is carried by a person riding on a vehicle and includes an acceleration sensor, when detecting deceleration of the vehicle in a direction of travel based on a measured value from the acceleration sensor, and detecting that posture of the device inclines in the direction of travel from a basic state then returns to the basic state.

A program storing medium of an example embodiment has a computer program causing a portable computer including an acceleration sensor to execute:
outputting an alarm signal, when detecting deceleration of a vehicle in a direction of travel based on a measured value from the acceleration sensor, and detecting that posture of a person riding on the vehicle inclines in the direction of travel from a basic state and then returns to the basic state.

Advantageous Effects of Invention

According to the present invention, a stop of a vehicle such as a train, for example, can be detected and notified with an adequate accuracy even when position information on a user or time information is not available.

EXAMPLE EMBODIMENT

First Example Embodiment

Overview

A portable stop determining device according to a first example embodiment of the present invention detects inclination of a body of a user with an acceleration sensor when a vehicle stops, and notifies the user of arrival at a destination. The body of the user inclines in the direction of travel due to deceleration of the vehicle (see FIG. 6), then returns to the original position due to the stop of the vehicle (see FIG. 7). This motion is large when the user is unconscious as the user is sleeping. The portable stop determining device detects this motion of the user and determines that the vehicle has stopped.

Note that the portable stop determining device may use position information on a user and time information as auxiliary information that prevents false detection.

When the functionality as the portable stop determining device is implemented as an application on a smartphone, the application is generally used as described below.

It is assumed that the user uses a train as a vehicle when traveling from a current position to a destination. The vehicle may be a bus, an automobile, or a ship, for example, instead of a train. Upon riding on the train, the user takes a seat, activates the application on the smartphone, and registers information about the destination and the train used. The user then puts the smartphone into a breast pocket, for example, and has a sleep. When the train arrives at the destination, determination as to a stop of the vehicle is made by the application. Then, the smartphone notifies the user of the arrival at the destination. With this, the sleeping user will awake and get off the train at the destination.

Configuration

Figure 1:
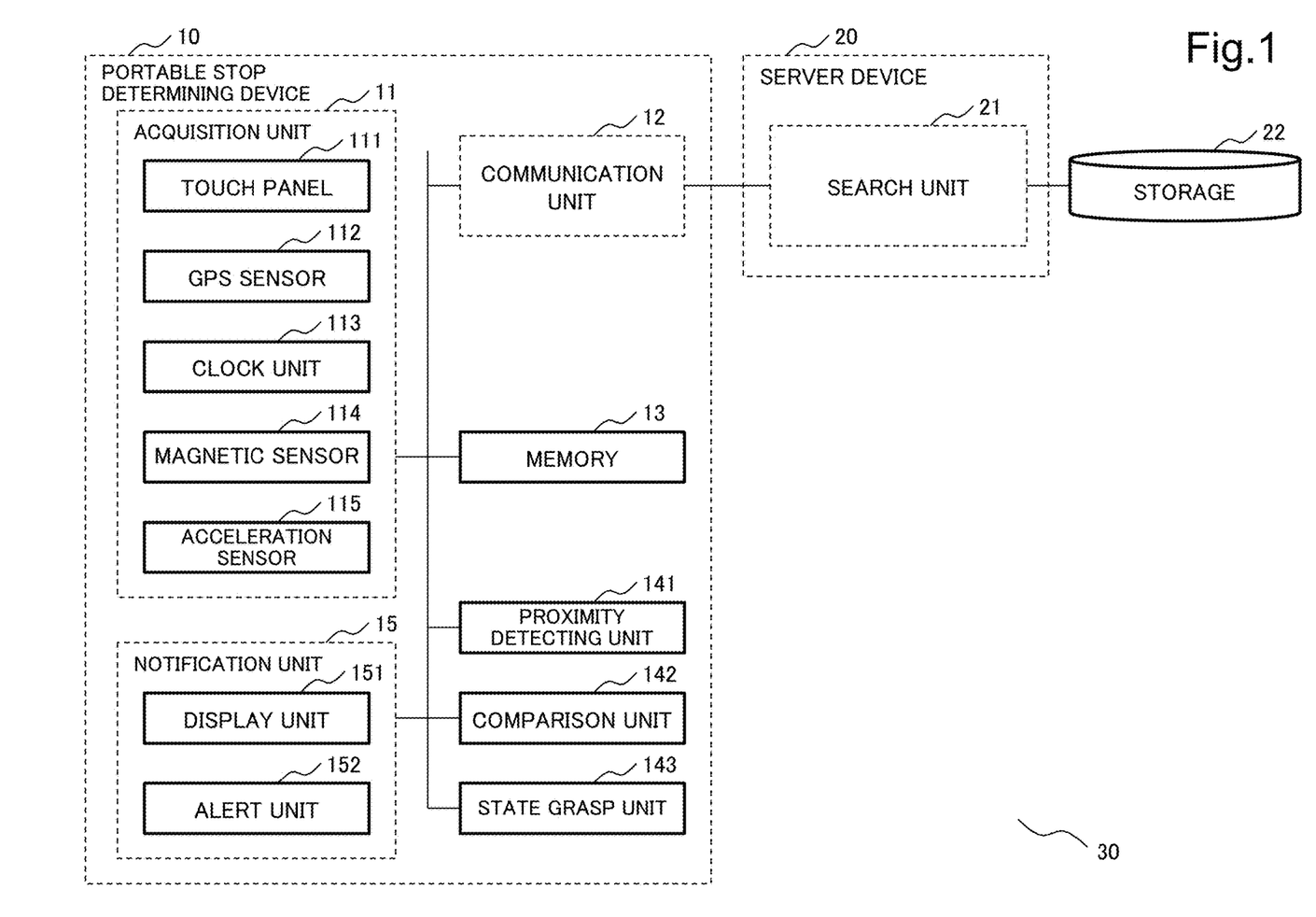
FIG. 1 is a block diagram illustrating a configuration of a stop determining system according to a first example embodiment of the present invention.

FIG. 1 is a block diagram illustrating a configuration of a stop determining system 30 according to the first example embodiment of the present invention. The stop determining system 30 includes a portable stop determining device 10, a server device 20 and a storage 22. The portable stop determining device 10 and the server device 20 are connected through a communication network, for example the Internet. Note that, while one portable stop determining device 10 is connected to one server device 20 in the example in FIG. 1, a plurality of portable stop determining devices 10 may be connected to one server device 20. The portable stop determining device 10 is implemented based on a smartphone, for example.

Configuration of Portable Stop Determining Device 10

The portable stop determining device 10 includes an acquisition unit 11, a communication unit 12, a memory 13, a proximity detecting unit 141, a comparison unit 142, a state grasp unit 143 and a notification unit 15.

Acquisition Unit 11

The acquisition unit 11 includes a touch panel 111, a GPS sensor 112, a clock unit 113, a magnetic sensor 114 (also referred to as an electronic compass), and an acceleration sensor 115.

The touch panel 111 is an input device provided in the portable stop determining device 10. When the touch panel 111 detects that the user has input an identifier of a destination and an identifier of a vehicle, the touch panel 111 outputs the data to the communication unit 12.

The GPS sensor 112 outputs latitude and longitude of a current position in response to an instruction from the proximity detecting unit 141 or the state grasp unit 143. The proximity detecting unit 141 and the state grasp unit 143 are capable of detecting how far the user has traveled and in which direction, by measuring the current position at regular intervals using an output from the GPS sensor 112.

The clock unit 113 outputs a current time in response to an instruction from the comparison unit 142.

The acceleration sensor 115 is a triaxial acceleration sensor, for example, and outputs information representing how much acceleration has occurred and in which direction in response to an instruction from the proximity detecting unit 141 or the state grasp unit 143.

Figure 2:
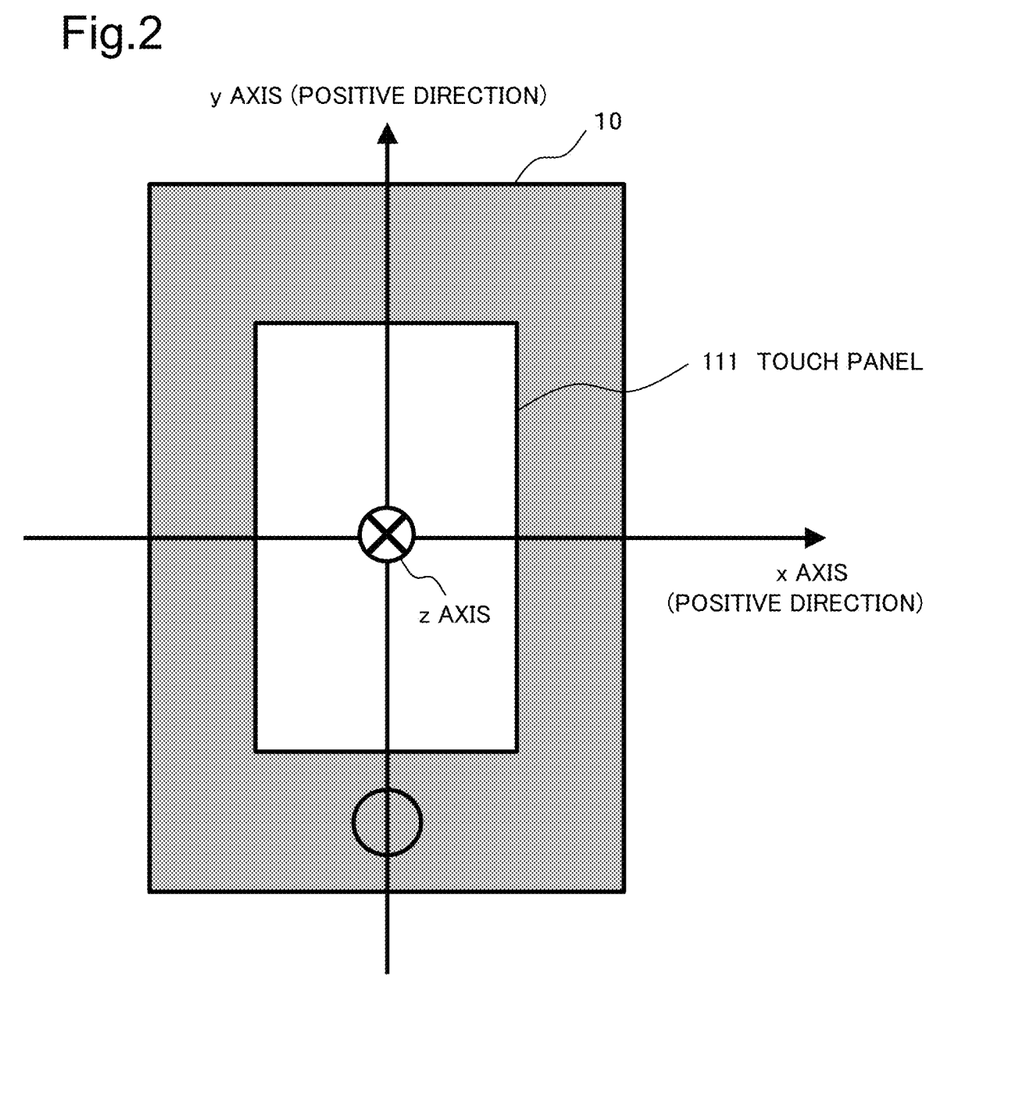
FIG. 2 is a diagram illustrating an example of three coordinate axes (x, y and z axes) used as references for a direction of detection by an acceleration sensor.

FIG. 2 is a diagram illustrating an example of three coordinate axes (x axis, y axis and z axis) used as references for an acceleration direction detected by the acceleration sensor 115. In FIG. 2, the portable stop determining device 10 is depicted as being vertically held by the user. The three coordinate axes intersect at right angles at the center of the portable stop determining device 10.

In the example in FIG. 2, the y axis is a coordinate axis that extends upward from the lower part of the portable stop determining device 10 vertically held by the user. The upper side is the positive coordinate side. The x axis is a coordinate axis that extends rightward from the left side of the portable stop determining device 10. The right side is the positive coordinate side. The z axis is a coordinate axis that extends from the frontside of the touch panel 111 in FIG. 2 toward the backside which is opposite from the frontside. The backside is the positive coordinate side.

The acceleration sensor 115 outputs a value representing, for example, that acceleration has been applied in the positive direction along the x coordinate axis or that travel speed in the positive direction has been decelerated.

The magnetic sensor 114 outputs data relating to azimuths (east, west, south and north) in response to an instruction from the proximity detecting unit 141 or the state grasp unit 143. For example, the magnetic sensor 114 outputs a value representing that the positive direction along the x axis is north.

Communication Unit 12 and Memory 13

The communication unit 12 transmits the identifier of the destination and the identifier of the vehicle input through the touch panel 111 to the server device 20 and, when the communication unit 12 receives destination information, for example position information on the destination and a scheduled arrival time as a response, stores the received data in the memory 13.

The memory 13 stores data output from the acquisition unit 11 and the communication unit 12 as well as data to be used by the proximity detecting unit 141, the comparison unit 142 and the state grasp unit 143.

Proximity Detecting Unit 141

The proximity detecting unit 141 performs the following operation by using the data stored in the memory 13.

The proximity detecting unit 141 drives the GPS sensor 112 and acquires information on the current position. The proximity detecting unit 141 then calculates a distance between a user (the portable stop determining device 10) and the destination by using position information on the destination stored in the memory 13. When the calculated distance is equal to or less than a predetermined distance (predetermined value), the proximity detecting unit 141 determines that arrival at the destination is close, and proceeds to the next operation.

The proximity detecting unit 141 drives the magnetic sensor 114, acquires an output value from the magnetic sensor 114, calculates the azimuth of a direction of travel of the vehicle on which the user (portable stop device 10) is riding based on the acquired output value, and stores the obtained azimuth data in the memory 13. Meanwhile, the proximity detecting unit 141 calculates the azimuth of the destination from the current position using the position information on the destination stored in the memory 13 and the current position information. The proximity detecting unit 141 then determines whether the azimuths (the azimuth of the direction of travel and the azimuth of the destination) are close to each other within a predetermined range. When the azimuths substantially agree with each other while the current position and the destination are close to each other, it means that the vehicle on which the user is riding is traveling straight toward the destination. In this case, the proximity detecting unit 141 determines that the user will soon arrive at the destination.

The proximity detecting unit 141 then outputs to a display unit 151 and an alert unit 152 of the notification unit 15 a prior notification of stop that represents that the destination is close.

Note that, the direction of travel is determined by any of the methods a) to c) described below, for example.

a) A fixed direction given in advance, for example, the positive direction along the z axis, is set as the direction of travel. In this case, the user holds the portable stop detecting device 10 in such a way that the positive direction along the z axis points to the direction of forward travel of the vehicle. For example, the user is seated, facing the direction of travel, and puts the portable stop detecting device 10 into a breast pocket with the backside of the portable stop detecting device 10 facing forward.

b) The user decides to hold the portable stop detecting device 10 in an appropriate direction and inputs the direction of travel at the time through the touch panel 111 to the portable stop detecting device 10. The state grasp unit 143 stores the direction in the memory 13. The proximity detecting unit 141 identifies the direction of travel with reference to the information. For example, when the user is seated while facing the direction perpendicular to the direction of travel and holding the portable stop determining device 10 in the breast pocket with the right-side of the portable stop determining device 10 in FIG. 2 being pointed to the direction of travel, the user inputs the x axis positive direction as the direction of travel.

c) While the vehicle is accelerating in the direction of travel in a straight-line section, the user performs an operation for registering the direction of travel through the touch panel 111. In response to the operation, the state grasp unit 143 activates the acceleration sensor 115 and, based on the output value from the acceleration sensor 115, stores the direction in which the vehicle is accelerating at the time into the memory 13 as the direction of travel. At this point in time, the state grasp unit 143 ignores acceleration in a preregistered direction of gravitational acceleration. The proximity detecting unit 141 identifies the direction of travel with reference to information registered in the memory 13.

Comparison Unit 142

The comparison unit 142 performs the following operation by using the data stored in the memory 13.

The comparison unit 142 acquires current time by using the clock unit 113 of the portable stop determining device 10. When a difference between the current time and the scheduled arrival time at the destination stored in the memory 13 is equal to or less than a predetermined value, the comparison unit 142 then determines that the vehicle will arrive at the destination in a short time.

The comparison unit 142 then outputs to the display unit 151 and the alert unit 152 of the notification unit 15 a prior notification of stop that represents that the destination is close.

State Grasp Unit 143

Figure 5:
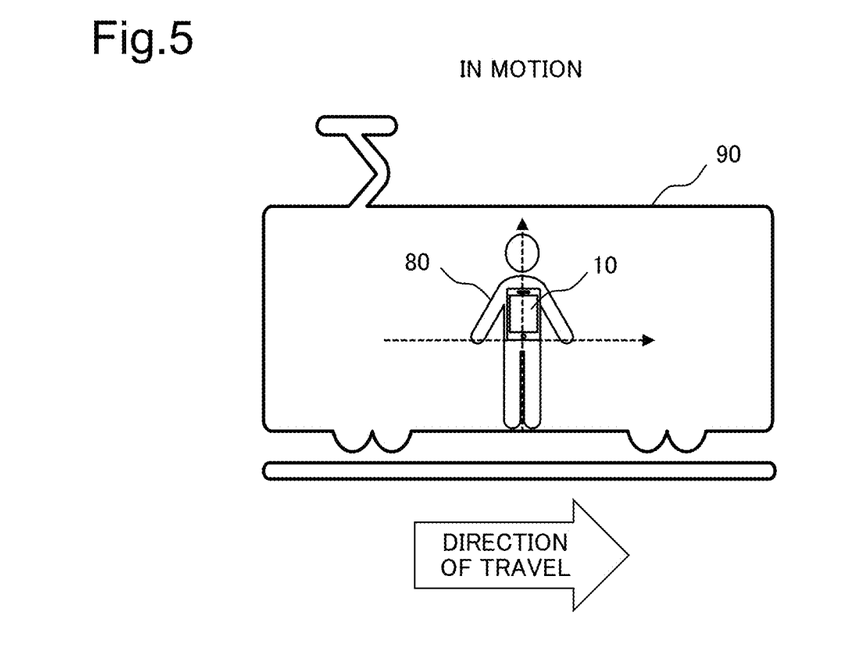
FIG. 5 is a diagram illustrating an exemplary state of a user during traveling.
Figure 6:
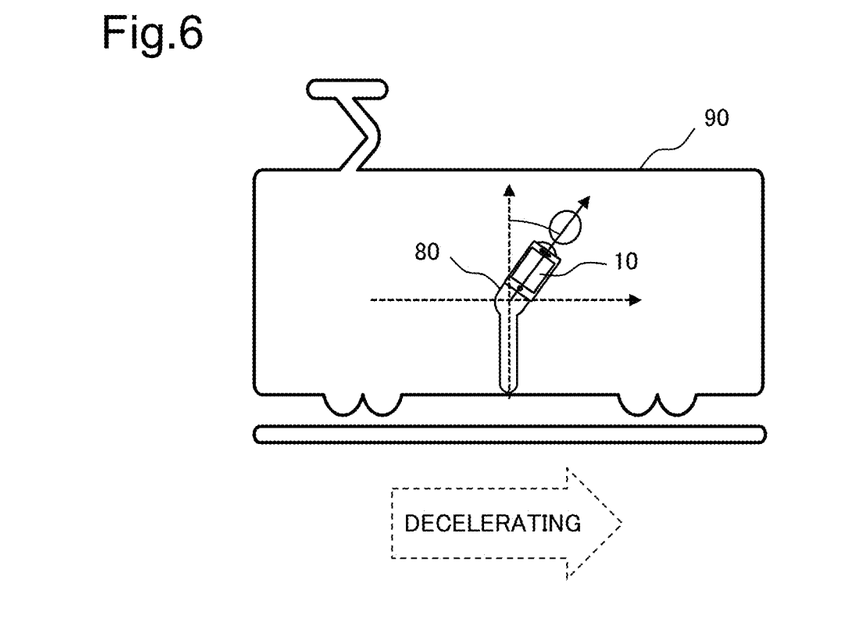
FIG. 6 is a diagram illustrating an exemplary state of a user during deceleration.

The state grasp unit 143 performs the following operation by using the data stored in the memory 13. Specifically, the state grasp unit 143 drives the acceleration sensor 115 and acquires acceleration. When the state grasp unit 143 detects, from the direction of travel of the vehicle that is stored in the memory 13 and an output value from the acceleration sensor 115, that deceleration equal to or greater than a certain amount has been performed in the direction of travel, the state grasp unit 143 calculates a degree of inclination of the user's body. This is performed in order to detect that the upper body of a user 80 which has been in an upright state (basic state) during traveling inclines due to inertial force caused by deceleration of a vehicle 90 as illustrated in FIG. 6. Note that the basic state of posture of the user here is a state of the user in which at least the upper body of the user is upright and includes not only a standing state of the user as illustrated in FIG. 5 but also a state in which the user is sitting up on a seat or the like. Further, the word "upright" may be sometimes used herein to refer to the user being in the basic state, such as "the user is in an upright posture", for example.

The state grasp unit 143 calculates the degree of inclination of the user's body as an angular difference between a registered direction of gravitational acceleration when the user is in an upright posture and a current direction of acceleration of gravity.

Figure 7:
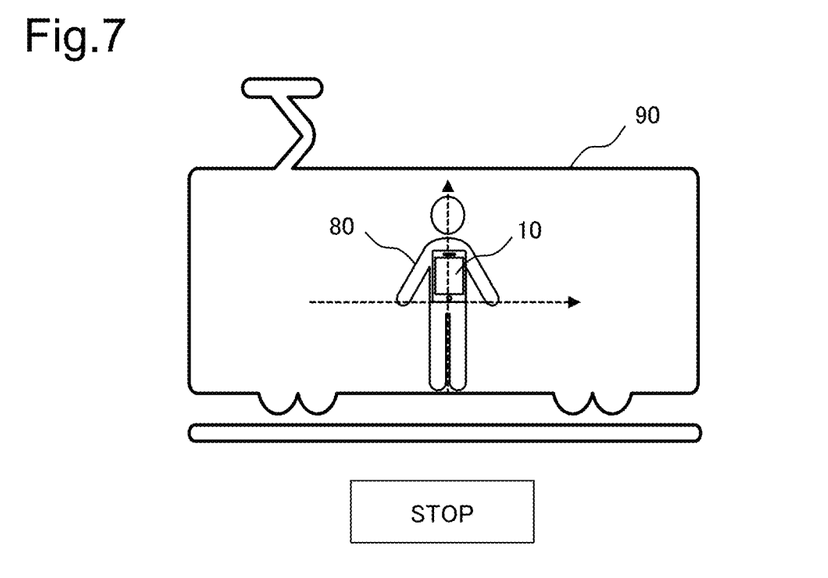
FIG. 7 is a diagram illustrating an exemplary state of a user in a stop.

To detect inclination of the user's body, it is desirable that the acceleration detected by the acceleration sensor 115 is only gravitational acceleration. Therefore, after the start of deceleration, the state grasp unit 143 may wait until the deceleration ends and acceleration is present only in the direction of gravitational force, then detect inclination of the user's body in this state. More precisely, the state grasp unit 143 may wait until, compared to acceleration in a certain direction (this is the direction of gravitational acceleration), acceleration in another direction becomes smaller by a predetermined factor ($\ll 1$) or less and then detect inclination of the user's body. Alternatively, the state grasp unit 143 may wait until a certain period of time (threshold RG) during which deceleration is expected to continue has elapsed since detection of the start of deceleration, then detect inclination of the user's body. The state grasp unit 143 then detects that the upper body of the user 80 returns to the upright state as illustrated in FIG. 7 when the vehicle 90 stops. Specifically, the state grasp unit 143 detects that the user 80 has returned to the upright state by detecting that the direction of gravitational acceleration returns to the direction of the gravitational acceleration that is present when the user 80 is in the upright posture.

Note that, the direction of gravitational acceleration present when the user is in the upright posture is determined according to any of f) to h) described below, for example, and is stored in the memory 13.

f) It is assumed that the direction of gravitational acceleration in the upright state (basic state) is set at a fixed direction given in advance, for example the negative direction along the y axis. In this case, the user in the upright state holds the portable stop determination device 10 in such a way that the negative direction along the y axis points directly downward.

g) The user holds the portable stop determining device 10 in an appropriate direction and inputs the directly downward direction at the time through the touch panel 111 to the portable stop determining device 10, and a direction based on this input information is stored in the memory 13 as the direction of gravitational acceleration in the upright state (basic state). The state grasp unit 143 detects the direction of gravitational acceleration in the upright state (basic state) with reference to the information stored in the memory 13.

h) The user performs an operation for registering the upright posture through the touch panel 111 while the user is holding the portable stop determining device 10 in an appropriate direction and the vehicle is at rest or is moving at a constant speed. In response to the operation, the state grasp unit 143 activates the acceleration sensor 115 and, based on an output value from the acceleration sensor 115, stores the direction of acceleration at the time in the memory 13 as the direction of gravitational acceleration in the upright state (basic state).

When the state grasp unit 143 detects the deceleration of the vehicle and then the stop of the vehicle as described above, the state grasp unit 143 determines that the vehicle used by the user has stopped at the destination and outputs a stop notification representing that the vehicle has stopped since the vehicle has arrived at the destination to the display unit 151 and the alert unit 152 of the notification unit 15.

Notification Unit 15

The notification unit 15 includes the display unit 151 and the alert unit 152.

When the display unit 151 receives the prior notification of stop, the display unit 151 indicates on a screen of the portable stop determining device 10 that the destination is close. Further, when the display unit 51 receives the stop notification, the display unit 151 indicates arrival at the destination on the screen of the portable stop determining device 10. The alert unit 152 receives the prior notification of stop and the stop notification, and notifies that the destination is close or notifies arrival by using an alarm sound or vibration.

Configuration of the Server Device 20

The server device 20 includes a search unit 21.

The server device 20 is connected to the storage 22. The storage 22 stores an identifier of a place of arrival of the vehicle or an identifier of a via location along a route to a place of arrival, the position of the place of arrival or the via location, and the scheduled arrival time at the place of arrival or the via location, in association with the identifier of the vehicle. For example, the identifier of the vehicle is a train name and a train number, such as "Nozomi 302", to give a specific example. The via location is a station at which the train stops, for example, and the storage 22 stores the position (latitude and longitude) of each stop station and the scheduled arrival time of the train at the station. Note that the storage 22 may further store various control parameters in association with the identifier of the vehicle.

When the search unit 21 of the server device 20 receives, from the portable stop determining device 10, the identifier of the vehicle and the identifier of the place of arrival or the via location, the search unit 21 acquires the position of the place of arrival or the via location associated with the received identifier, the scheduled arrival time at the place of arrival or the via location, and other parameters from the memory device 22 and transmits back them to the portable stop determining device 10.

The stop determining system 30 according to the first example embodiment is configured as described above. The communication unit 12, the proximity detecting unit 141, the comparison unit 142, and the state grasp unit 143 of the portable stop determining device 10 constituting the stop determining system 30 are composed of logic circuits or dedicated processing units (PUs) and firmware, for example.

Figure 3:
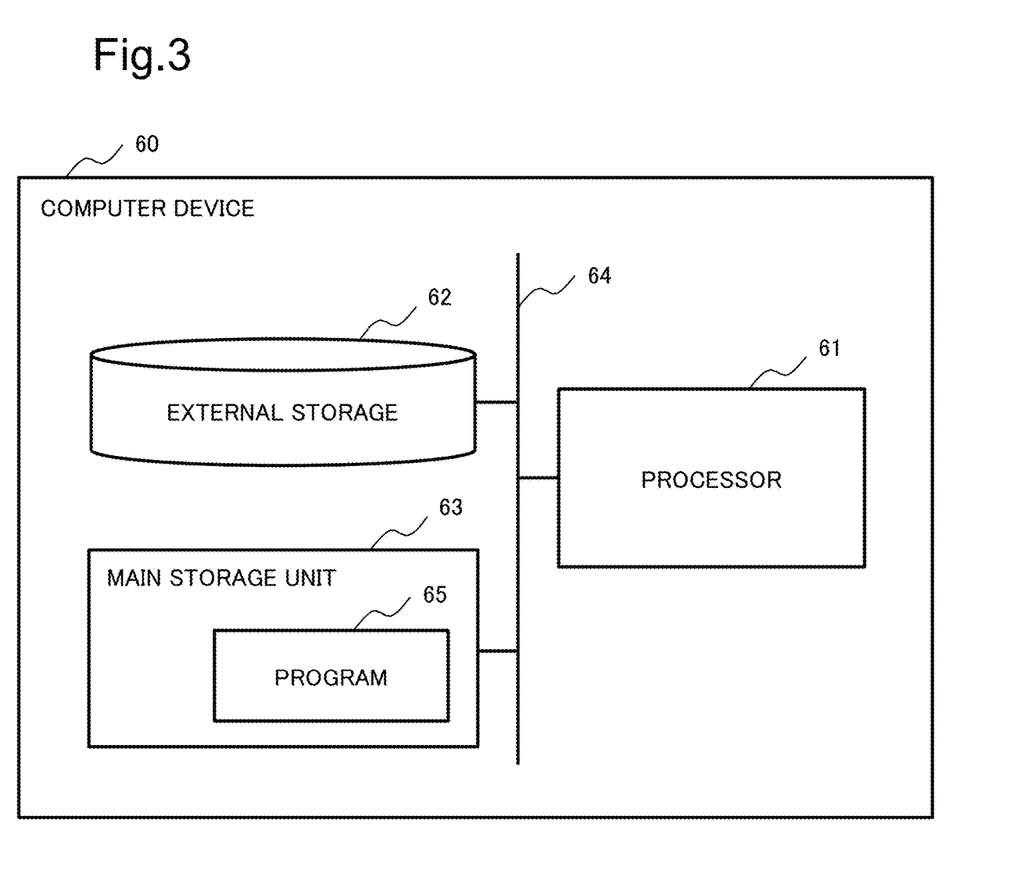
FIG. 3 is a configuration diagram of a computer device.

The portable stop determining device 10 may be composed of a computer device 60 as illustrated in FIG. 3, for example a smartphone. In this case, the communication unit 12, the proximity detecting unit 141, the comparison unit 142, and the state grasp unit 143 may be implemented by a program, a so-called application, and a central processing unit (CPU).

The computer device 60 illustrated in FIG. 3 includes a processor 61, a main storage unit 63 and an external storage 62 which are interconnected through a bus 64. The processor 61 reads and writes data stored in the main storage unit 63 and the externals storage 62 through the bus 64.

Further, the processor 61 executes a program (computer program) 65 stored in the main storage unit 63. Note that, the program 65 may be stored in the external storage 62 before initial setting of the computer device 60, and may be loaded by the processor 61 from the external storage 62 into the main storage unit 63 at the time of initial setting of the computer device 60.

The main storage unit 63 here is a semiconductor memory device, for example. The external storage 62 is a storage such as a hard disk drive (HDD) or a solid state drive (SSD). The main storage unit 63 functions as the memory 13, for example.

The processor 61 of the portable stop determining device 10 functions as the communication unit 12, the proximity detecting unit 141, the comparison unit 142 or the state grasp unit 143 by executing the program 65. In other words, the processor 61 performs processing performed by the communication unit 12, the proximity detecting unit 141, the comparison unit 142 or the state grasp unit 143 by executing the program 65.

Operation

Figure 4A:
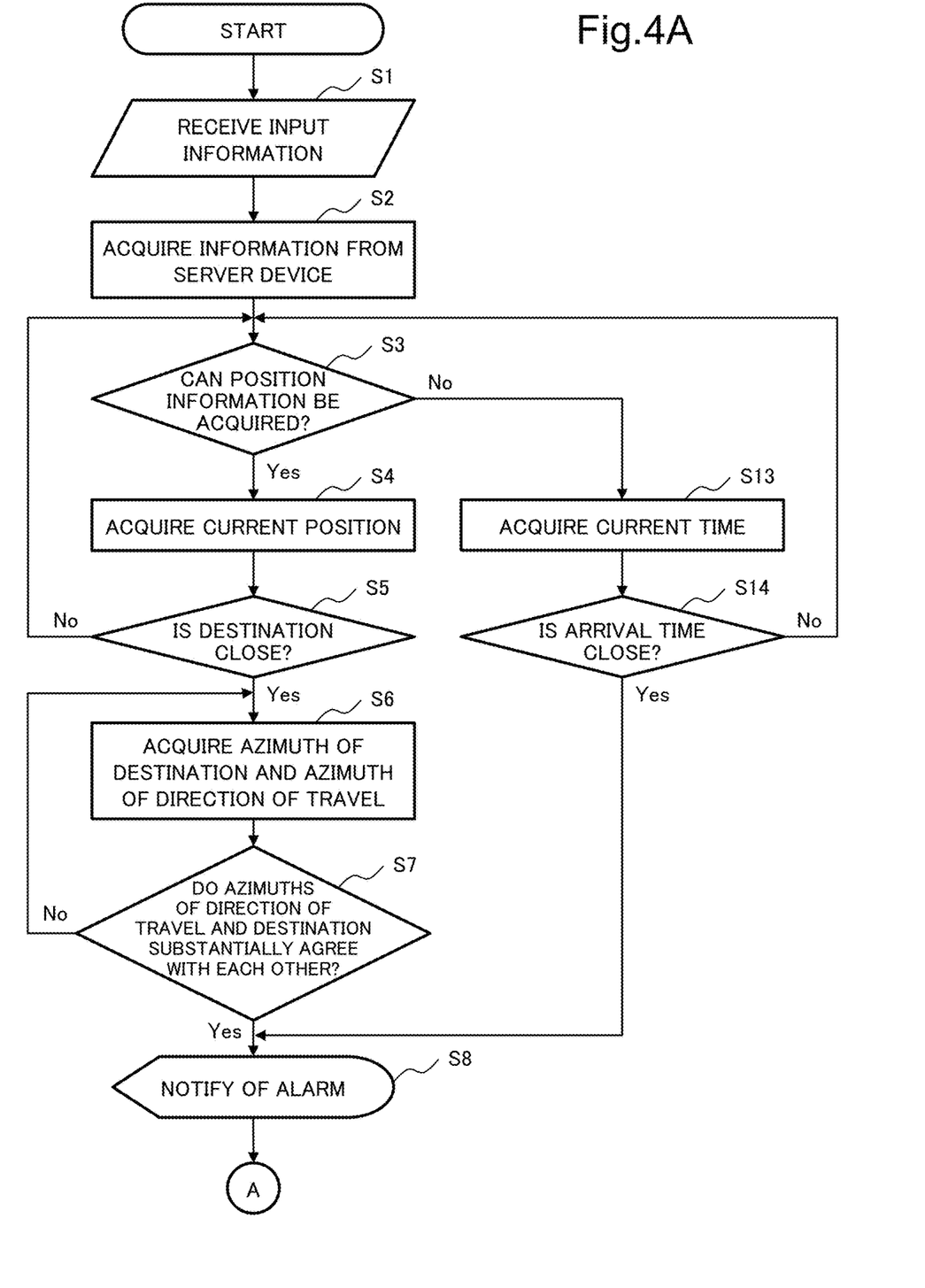
FIG. 4A is a flowchart illustrating an exemplary operation of a portable stop determining device according to the first example embodiment.
Figure 4B:
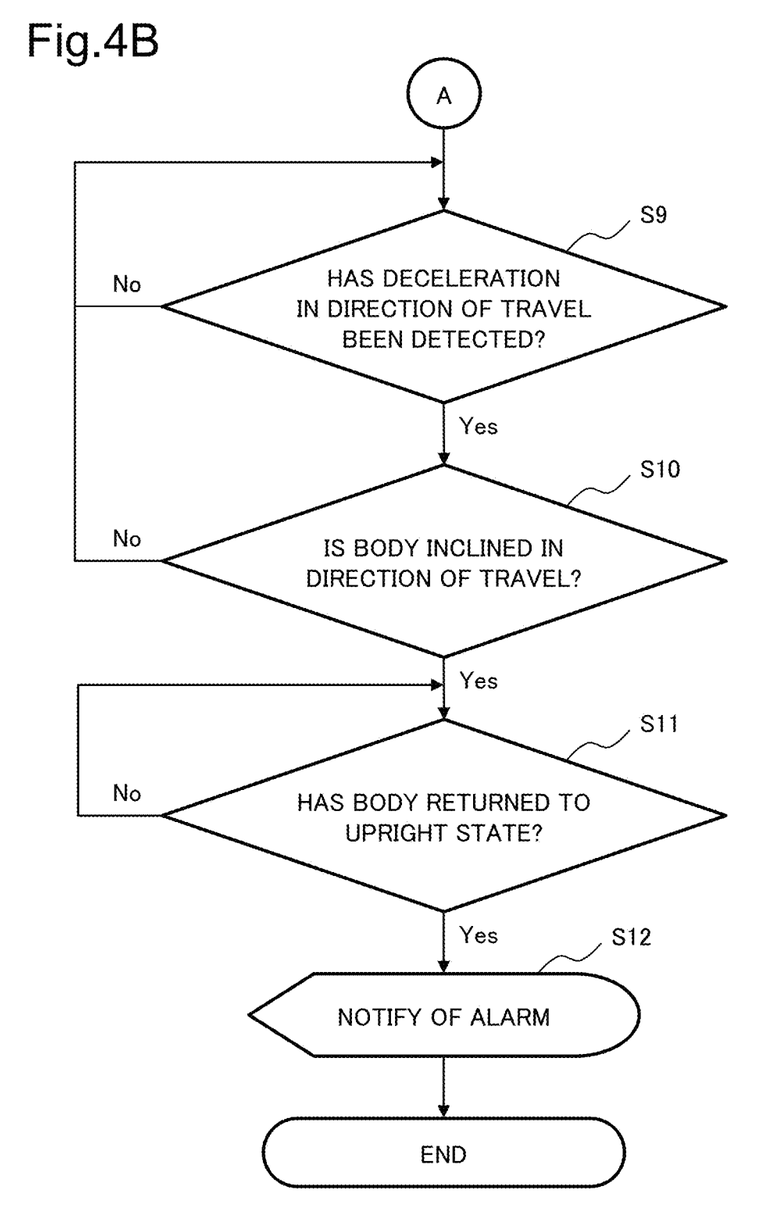
FIG. 4B is a flowchart following FIG. 4A and illustrating an exemplary operation of the portable stop determining device.

FIGS. 4A and 4B are flowcharts illustrating an exemplary operation of the portable stop determining device 10.

S1: Input of the Identifiers of the Destination and the Vehicle and Registration of a Direction of Travel and a Direction of Gravitational Acceleration A user who gets on the vehicle, for example, a train, and has a seat first activates the portable stop determining device 10 and inputs the identifiers of the vehicle and the destination on the touch panel 111. The communication unit 12 receives the information (input information) on the input identifiers and transmits the received information on the identifiers to the server device 20. Further, when the information related to the direction of travel and the direction of gravitational acceleration and the like are input, the state grasp unit 143 registers the input information in the memory 13.

At this point in time, the user may perform an operation for registering the upright posture and an operation for registering the direction of travel. When information related to the upright posture, the direction of gravitational acceleration, and the like is input by such operations, the state grasp unit 143 registers the input information in the memory 13. After the completion of the operations, the user puts the portable stop determining device 10 in a place where inclination of the body can be detected, for example a breast pocket.

S2: Acquisition of Information Related to the Destination from the Server Device 20

In the server device 20, the search unit 21 receives the information on the identifiers of the vehicle and the destination sent from the portable stop determining device 10, searches the storage 22 using the information as a key, and retrieves destination information including the position information of the destination and the scheduled arrival time. The search unit 21 transmits the retrieved information back to the portable stop determining device 10. In the portable stop determining device 10, the communication unit 12 receives the destination information and stores the destination information in the memory 13.

S3: Determination as to Whether the Position Information can be Acquired

The proximity detecting unit 141 drives the GPS sensor 112 and determines whether the coordinates of the current position can be acquired. When the coordinates can be acquired (Yes in S3), the flow proceeds to S4; when the coordinates cannot be acquired (No in S3), the flow proceeds to S13.

S4: Measurement of Latitude and Longitude

The proximity detecting unit 141 acquires information related to the current position using the GPS sensor 112 and stores the acquired information in the memory 13.

S5: Determination as to Whether the Destination is Close

The proximity detecting unit 141 calculates the distance between the current position and the destination from the position information of the both of the current position and the destination and determines whether the calculated value is equal to or less than a certain threshold R1. When the calculated value is equal to or less than the threshold R1 (Yes in S5), the flow proceeds to S6. This means that the current position is close to the destination.

Meanwhile, when the calculated value is greater than the threshold R1 (No in S5), the proximity detecting unit 141 returns to S3 of the flow and reattempts to acquire the current position. The attempt is made because this means that the current position is away from the destination.

The threshold R1 is chosen to be a value appropriately set in accordance with the vehicle and a route. Further, the information may be stored in the storage 22 and may be sent from the server device 20 to the portable stop determining device 10 as part of the destination information.

S6: Acquisition of the Azimuth of the Direction of Travel and the Azimuth of the Destination The proximity detecting unit 141 acquires the information related to azimuths by driving the magnetic sensor 114 and calculates the azimuth of the direction of travel stored in the memory 13. Further, from the position information of the current position and the position information of the destination, the proximity detecting unit 141 calculates the azimuth of the destination from the current position.

S7: Determination as to Whether the Azimuths of the Direction of Travel and the Destination Substantially Agree With Each Other The proximity determining unit 141 determines whether the difference between the azimuth of the destination from the current position and the azimuth of the direction of travel, for example the angle between both azimuths is equal to or less than a certain threshold R2. When the angle is equal to or less than the threshold R2 (Yes in S7), the flow proceeds to S8; when the angle is greater than the threshold R2 (No in S7), the flow returns to S6. The angle equal to or less than the threshold R2 means that the vehicle on which the user is riding is in a stop preparation state.

Note that the threshold R2 may be stored in the storage 22 and may be sent from the server device 20 to the portable stop determining device 10 as part of the destination information.

S13: Acquisition of the Current Time

When the position information cannot be acquired, the comparison unit 142 acquires the current time from the clock unit 113 of the portable stop determining device 10.

S14: Determination as to Whether Arrival Time is Close

The comparison unit 142 compares the current time with the information on the scheduled arrival time and determines whether the difference between the current time and the scheduled arrival time is equal to or less than a certain threshold RB, for example three minutes or less. When the difference is equal to or less than the threshold RB (Yes in S14), the flow proceeds to S8. This means that the arrival at the destination is close. On the other hand, when the difference is greater than the threshold RB (No in S14), the flow returns to S3.

Note that the threshold RB may be stored in the storage 22 and may be sent from the server device 20 to the portable stop determining device 10 as part of the destination information. The value is a value that can be set by the user.

S8: Alert Notification

In response to the notification from the proximity unit 141 or the comparison unit 142 that the destination is close, the alert unit 152 notifies the user that the destination is close by using sound or vibration. Further, the proximity detecting unit 141 or the comparison unit 142 starts an operation to cause the state grasp unit 143 to detect posture of the user.

S9: Detection of Deceleration

The state grasp unit 143 first determines whether the deceleration of the vehicle in the direction of travel has been detected and, when not detected (No in S9), the state grasp unit 143 repeats the determination operation until deceleration is detected. When the state grasp unit 143 detects deceleration (Yes in S9), the flow proceeds to S10. This deceleration is considered to be deceleration for a stop. Note that, small deceleration is likely to be deceleration for some reasons other than a stop, such as for the purpose of following the timetable, whereas large deceleration is likely to be deceleration caused by an emergency stop of the vehicle or sway of the body of the user being caught asleep, instead of deceleration for a stop. By taking into consideration these factors, it is assumed that the deceleration to be detected here is deceleration within a preset range that is considered to be deceleration for a stop.

Information on the preset range may be stored in the storage 22 and may be sent from the server device 20 to the portable stop determining device 10 as part of the destination information.

S10: Detection of Inclination of the Body in the Direction of Travel

The state grasp unit 143 drives the acceleration sensor 115 and detects the inclination of the user's body by using the output value from the acceleration sensor 115. When the difference (the angle) between the current direction of gravitational acceleration and the direction of gravitational acceleration preregistered at the registration of the upright posture is equal to or greater than a predetermined threshold R3, the state grasp unit 143 determines that the user's body inclines in the direction of travel (Yes in S10) and the vehicle 90 is decelerating (see FIG. 6). Then, the flow proceeds to S11. On the other hand, when the user's body does not incline in the direction of travel (No in S10), the state grasp unit 143 repeats the operation for detecting the inclination of the user's body. Note that, the state grasp unit 143 may determine that the inclination is in the direction of travel based on the direction in which the difference occurs, or may determine only that there is the inclination without especially checking whether the inclination is in the direction of travel since the inclination occurred immediately after deceleration.

Note that the threshold R3 may be stored in the storage 22 and may be sent from the server device 20 to the portable stop determining device 10 as part of the destination information.

S11: Detection of Recovery From the Inclination of the Body

After detecting the inclination of the user's body, the state grasp unit 143 determines whether the upper body of the user has returned to the upright state and, when not returned (No in S11), repeats the determination operation. When the angle between the current direction of gravitational acceleration and the direction of gravitational acceleration at registration of the upright posture becomes equal to or less than a predetermined threshold R4 (where R4<<R3), the state grasp unit 143 determines that the user's body has returned to the upright state (basic state) (Yes in S11). With this, the flow proceeds to S12. This state means that the vehicle body has stopped (see FIG. 7) and the inclination of the upper body of the user has recovered from the inclination. Then, the state grasp unit 143 outputs the notification of arrival at the destination to the alert unit 152.

Note that the threshold R4 may be stored in the storage 22 and may be sent from the server device 20 to the portable stop determining device 10 as part of the destination information.

S12: Alert Notification

In response to the notification of arrival at the destination from the state grasp unit 143, the alert unit 152 notifies the user of the arrival at the destination by using sound or vibration.

Example Variation

The portable stop determining device 10 may detect the stop of the vehicle based only on the inclination of the user's body discerned by the state grasp unit 143. In other words, the determination as to proximity to the destination by the proximity detecting unit 141 or the comparison unit 142 (S1 to S8 of FIG. 4A) may be omitted. In this case, the GPS sensor 112 and the magnetic sensor 114 can be omitted.

The position information and the time information are used for the purpose of preventing false detection of inclination of the body or the like due to emergency stop of the vehicle and is not necessarily needed for stop determination with the acceleration sensor 115.

The portable stop determining device 10 determines, based on the output value from the acceleration sensor 115, whether the vehicle stops. Accordingly, the portable stop determining device 10 can be implemented on a smartphone. Further, the portable stop determining device 10 may be configured to determine, using an acceleration sensor of a smartwatch or a pedometer, whether the vehicle stops, and to notify of the stop of the vehicle, using an alarm unit or a vibration unit of a mobile phone.

Advantageous Effects

The portable stop determining device 10 according to the first example embodiment is capable of detecting and notifying of the stop of the vehicle such as a train with an adequate accuracy. This is because, based on the output value from the acceleration sensor 115, the state grasp unit 143 detects the stop of the vehicle by taking advantage of the fact that the user's body inclines in the direction of travel due to deceleration before the stop and returns to the upright state, after the stop.

Second Example Embodiment 2

Figure 8:
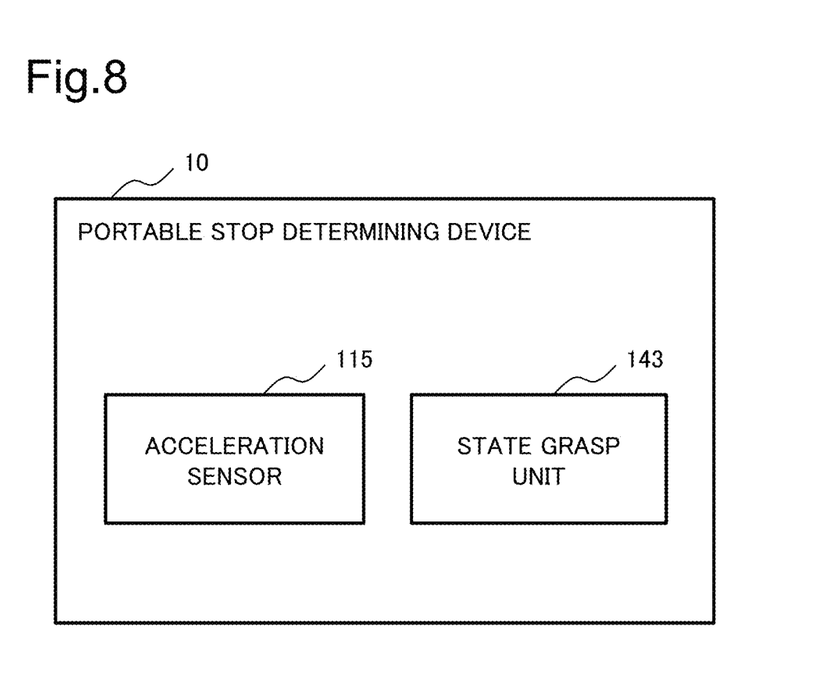
FIG. 8 is a block diagram illustrating a configuration of a portable stop determining device according to a second example embodiment of the present invention.

FIG. 8 is a block diagram illustrating a configuration of a portable stop determining device 10 according to a second example embodiment of the present invention.

The portable stop determining device 10 according to the second example embodiment includes the acceleration sensor 115 and the state grasp unit 143. When the state grasp unit 143 detects, based on the measured value of the acceleration sensor 115, deceleration of the vehicle in the direction of travel and detects that posture of its owner has inclined in the direction of travel from the basic state and then has returned to the basic state, the state grasp unit 143 outputs the alarm signal.

The portable stop determining device 10 according to the second example embodiment is capable of detecting and notifying of the stop of the vehicle such as a train with an adequate accuracy even when the position information on the user and the time information are not available. This is because, based on the output value from the acceleration sensor 115, the state grasp unit 143 detects the stop of the vehicle by taking advantage of the fact that the user's body inclines once and then returns to the basic state.

While the present invention has been described with reference to example embodiments, the present invention is not limited to the example embodiments described above. Various modifications that can be understood by those skilled in the art can be made to the configurations and details of the present invention within the scope of the present invention.

REFERENCE SIGNS LIST

10 Portable stop determining device
11 Acquisition unit
12 Communication unit
13 Memory
15 Notification unit
20 Server device
21 Search unit
22 Storage
30 Stop determining system
60 Computer device
61 Processor
62 External storage
63 Main storage unit
65 Program
111 Touch panel
112 GPS sensor
113 Clock unit
114 Magnetic sensor
115 Acceleration sensor
141 Proximity detecting unit
142 Comparison unit
143 State grasp unit
151 Display unit

The invention claimed is:

1. A portable stop determining device comprising:
an acceleration sensor; and
a processor configured to:
receive information from the acceleration sensor;
detect deceleration of a vehicle in a direction of travel based on the information from the acceleration sensor; and
output an alarm signal when detecting, based on the received information from the acceleration sensor, that posture of the portable stop determining device carried by a person riding on the vehicle returns to a basic state after inclining in the direction of travel from the basic state,
wherein the processor determines that the posture of the portable stop determining device inclines in the direction of travel when an angle representing the posture of the portable stop determining device is equal to or greater than a first predetermined angle, and determines that the portable stop determining device is in the basic state when the angle is equal to or less than a second predetermined angle being smaller than the first predetermined angle, the angle is an angle between a direction of gravitational acceleration based on the received information from the acceleration sensor and a direction of gravitational acceleration preregistered in a situation where the portable stop determining device is in the basic state.

2. The portable stop determining device according to claim 1, wherein the processor determines that an acceleration direction based on the received information from the acceleration sensor when an operation to register the direction of travel is being performed is the direction of travel.

3. The portable stop determining device according to claim 1, further comprising:
a GPS sensor that acquires a current position,
wherein the processor receives information from the GPS sensor and starts to perform a processing relating to output of the alarm signal when a distance between a stored position of destination and the current position becomes equal to or less than a predetermined value.

4. The portable stop determining device according to claim 3, further comprising a magnetic sensor that measures an azimuth, wherein the processor receives information from the magnetic sensor and determines an azimuth of the direction of travel based on the information from the magnetic sensor, and starts to perform the processing relating to the output of the alarm signal when a distance between the stored position of destination and the current position becomes equal to or less than a predetermined value and an azimuth of the destination from the current position and an azimuth of the direction of travel are identical.

5. The portable stop determining device according to claim 1, wherein the processor is configured further to compare an interval between a scheduled arrival time and a current time with a predetermined value and, when the interval becomes equal to or less than the predetermined value, starts to perform the processing relating to the output of the alarm signal.

6. A stop determining method performed by a processor of a device, the method comprising:
receiving information from an acceleration sensor, the acceleration sensor being included in the device that is carried by a person riding on a vehicle;
detecting deceleration of the vehicle in a direction of travel based on the information from the acceleration sensor; and
outputting an alarm signal when detecting, based on the received information from the acceleration sensor, that posture of the device returns to a basic state after inclining in the direction of travel from the basic state,
further comprising:
determining that the posture of the device inclines in the direction of travel when an angle representing the posture of the device is equal to or greater than a first predetermined angle, and determining that the device is in the basic state when the angle is equal to or less than a second predetermined angle being smaller than the first predetermined angle, the angle being an angle between a direction of gravitational acceleration based on the received information from the acceleration sensor and a direction of gravitational acceleration preregistered in a situation where the device is in the basic state.

* * * * *